United States Patent
Bao et al.

(10) Patent No.: US 11,004,221 B2
(45) Date of Patent: May 11, 2021

(54) DEPTH RECOVERY METHODS AND APPARATUSES FOR MONOCULAR IMAGE, AND COMPUTER DEVICES

(71) Applicant: ZHEJIANG SENSETIME TECHNOLOGY DEVELOPMENT CO., LTD., Zhejiang (CN)

(72) Inventors: Hujun Bao, Hangzhou (CN); Guofeng Zhang, Hangzhou (CN); Qinhong Jiang, Hangzhou (CN); Jianping Shi, Hangzhou (CN)

(73) Assignee: ZHEJIANG SENSETIME TECHNOLOGY DEVELOPMENT CO., LTD., Hangzhou (CN)

( * ) Notice: Subject to any disclaimer, the term of this patent is extended or adjusted under 35 U.S.C. 154(b) by 24 days.

(21) Appl. No.: 16/724,287

(22) Filed: Dec. 21, 2019

(65) Prior Publication Data
US 2020/0143552 A1 May 7, 2020

Related U.S. Application Data

(63) Continuation of application No. PCT/CN2018/116276, filed on Nov. 19, 2018.

(30) Foreign Application Priority Data

May 23, 2018 (CN) .......................... 201810502947.0

(51) Int. Cl.
*G06T 7/00* (2017.01)
*G06T 7/50* (2017.01)
*G06T 5/50* (2006.01)

(52) U.S. Cl.
CPC .................. *G06T 7/50* (2017.01); *G06T 5/50* (2013.01); *G06T 2207/20081* (2013.01); *G06T 2207/20084* (2013.01); *G06T 2207/20221* (2013.01)

(58) Field of Classification Search
CPC ... G06T 7/50; G06T 5/50; G06T 2207/20081; G06T 2207/20084; G06T 2207/20221;
(Continued)

(56) References Cited

U.S. PATENT DOCUMENTS 9,471,988 B2 * 10/2016 Mukherjee ........... H04N 13/261
2011/0110583 A1 * 5/2011 Zhang .................... G06T 7/579
382/154

(Continued)

FOREIGN PATENT DOCUMENTS

CN          103413347 A          11/2013
CN          105374039 A          3/2016
(Continued)

OTHER PUBLICATIONS

International Search Report in the international application No. PCT/CN2018/116276, dated Feb. 25, 2019.
(Continued)

*Primary Examiner* — Ping Y Hsieh
(74) *Attorney, Agent, or Firm* — Junjie Feng

(57) ABSTRACT

A depth recovery method includes: performing feature extraction on a monocular image to obtain a feature image of the monocular image; decoupling the feature image to obtain a scene structure graph of the feature image; performing gradient sensing on the feature image and the scene structure graph to obtain a region-enhanced feature image; and performing depth estimation according to the region-enhanced feature image to obtain a depth image of the monocular image.

20 Claims, 7 Drawing Sheets

(58) Field of Classification Search
CPC . G06T 2207/10004; G06T 2207/20016; G06T 5/008
See application file for complete search history.

(56) References Cited

U.S. PATENT DOCUMENTS

| | | | |
|---|---|---|---|
| 2012/0002871 A1 | 1/2012 | Hu | |
| 2013/0069934 A1* | 3/2013 | Wang | H04N 13/128 345/419 |
| 2018/0231871 A1* | 8/2018 | Wang | G06K 9/00208 |
| 2019/0295315 A1* | 9/2019 | Levinson | G06T 5/50 |
| 2020/0058140 A1* | 2/2020 | Meldrum | G01N 15/1434 |

FOREIGN PATENT DOCUMENTS

| | | |
|---|---|---|
| CN | 106768325 A | 5/2017 |
| CN | 107204010 A | 9/2017 |
| CN | 107578436 A | 1/2018 |
| JP | 2012525190 A | 10/2012 |

OTHER PUBLICATIONS

Li, Yaoyu et al. "Structured Deep Learning Based Depth Estimation from a Monocular Image", Robot, vol. 39, No. 6, Nov. 30, 2017 (Nov. 30, 2017), entire document.
Li, Xiaoming et al. "Research on Three Dimensional Reconstruction Based on Median Filtering", Instrumentation Technology, vol. 3, issued on Mar. 15, 2016, pp. 19-22.
Marco Visentini-Scarzanella et al. "Deep monocular 3D reconstruction for assisted navigation in bronchoscopy", International Journal of Computer Assisted Radiology and Surgery, vol. 12, issued on May 15, 2017, pp. 1089-1099.
First Office Action of the Chinese application No. 201810502947.0, dated Apr. 22, 2020.
First Office Action of the Japanese application No. 2020-520708, dated Nov. 20, 2020.
English translation of the Written Opinion of the International Search Authority in the international application No. PCT/CN2018/116276, dated Feb. 25, 2019.

* cited by examiner

DEPTH RECOVERY METHODS AND APPARATUSES FOR MONOCULAR IMAGE, AND COMPUTER DEVICES

CROSS-REFERENCE TO RELATED APPLICATIONS

The present application is a continuation of International Application No. PCT/CN2018/116,276 filed on Nov. 19, 2018, which claims priority to Chinese patent application No. 201810502947.0 filed on May 23, 2018. The disclosures of these applications are hereby incorporated by reference in their entirety.

BACKGROUND

Depth recovery of a monocular image refers to performing depth recovery on a monocular image, is an important issue in the field of computer visions, and is significantly applied to many fields, such as three-dimensional reconstruction, robot real-time positioning, and visual obstacle avoidance.

However, depth recovery of a monocular image is a complex issue with multiple solutions due to the uncertainty of the depth scale. A large variety of existing depth estimation schemes generally involve simultaneous solving by simply coupling estimation of the scene structure to estimation of the depth scale, thus making the solution process of the issue relatively difficult, requiring a large amount of data and training time, and having low precision.

SUMMARY

The present disclosure relates to the field of computer visions, and in particular, to depth recovery methods and apparatuses for a monocular image, computer devices, computer-readable storage media, and computer programs.

In order to solve the technical problem above, embodiments of the present disclosure provide depth recovery methods and apparatuses for a monocular image, computer devices, computer-readable storage media, and computer programs.

A depth recovery method for a monocular image provided in the embodiments of the present disclosure includes: performing feature extraction on a monocular image to obtain a feature image of the monocular image; decoupling the feature image to obtain a scene structure graph of the feature image; performing gradient sensing on the feature image and the scene structure graph to obtain a region-enhanced feature image; and performing depth estimation according to the region-enhanced feature image to obtain a depth image of the monocular image.

A depth recovery apparatus for a monocular image provided in the embodiments of the present disclosure includes: a memory storing processor-executable instructions; and a processor arranged to execute the stored processor-executable instructions to perform steps of: performing feature extraction on the monocular image to obtain a feature image of the monocular image; decoupling the feature image to obtain a scene structure graph of the feature image; performing gradient sensing on the feature image and the scene structure graph to obtain a region-enhanced feature image; and performing depth estimation according to the region-enhanced feature image to obtain a depth image of the monocular image.

A depth recovery apparatus for a monocular image provided in the embodiments of the present disclosure includes: a feature extraction module, configured to perform feature extraction on a monocular image to obtain a feature image of the monocular image; a scene structure estimation module, configured to decouple the feature image to obtain a scene structure graph of the feature image; a gradient sensing module, configured to perform gradient sensing on the feature image and the scene structure graph to obtain a region-enhanced feature image; and a depth estimation module, configured to perform depth estimation according to the region-enhanced feature image to obtain a depth image of the monocular image.

The embodiments of the present disclosure provide a computer device, including a memory and a processor, wherein the memory has computer executable instructions stored thereon, and the processor implements the depth recovery method for a monocular image provided in the embodiments of the present disclosure when operating the computer executable instructions on the memory.

The embodiments of the present disclosure provide a non-transitory computer-readable storage medium having stored thereon computer-readable instructions that, when executed by a processor, cause the processor to implement a depth recovery method for a monocular image, the method includes performing feature extraction on the monocular image to obtain a feature image of the monocular image; decoupling the feature image to obtain a scene structure graph of the feature image; performing gradient sensing on the feature image and the scene structure graph to obtain a region-enhanced feature image; and performing depth estimation according to the region-enhanced feature image to obtain a depth image of the monocular image.

The embodiments of the present disclosure provide a computer program, including computer instructions. When the computer instructions are operated in a processor of a device, the depth recovery method for a monocular image provided in the embodiments of the present disclosure is implemented.

It should be understood that the above general description and the following detailed description are merely exemplary and explanatory and are not intended to limit the present disclosure.

BRIEF DESCRIPTION OF DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION OF THE PREFERRED EMBODIMENTS

Figure 1:
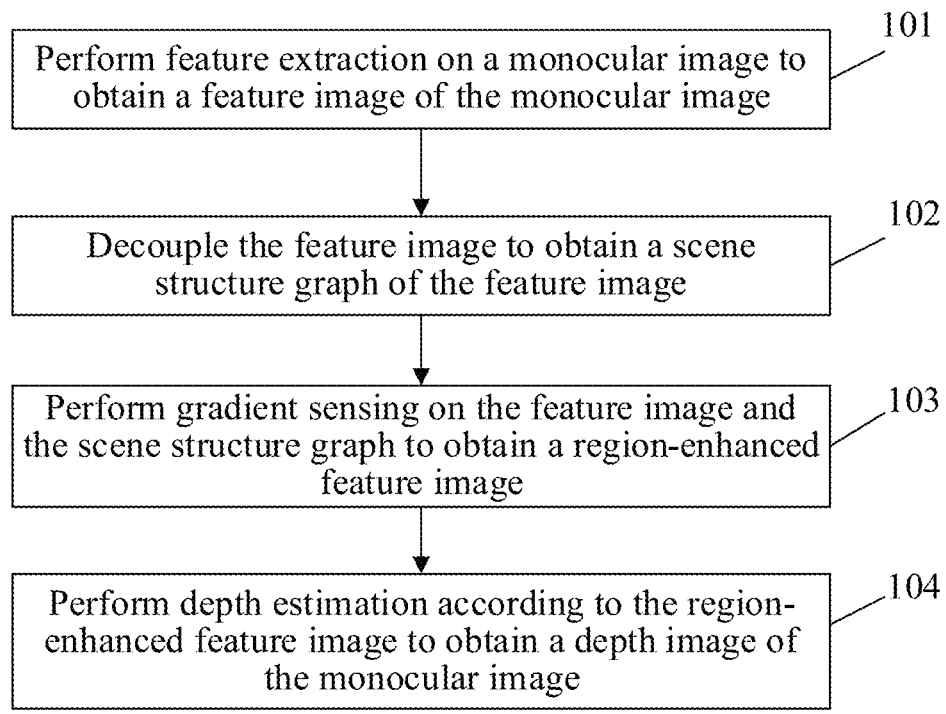
FIG. 1 is an exemplary flowchart of a depth recovery method for a monocular image according to embodiments of the present disclosure.

Various exemplary embodiments of the present disclosure are now described in detail with reference to the accompanying drawings. It should be noted that, unless otherwise stated specifically, relative arrangement of the components, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the disclosures or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to an electronic device such as a computer system/server, which may operate with numerous other general-purpose or special-purpose computing system environments or configurations. Examples of well-known computing systems, environments, and/or configurations suitable for use together with the electronic devices such as the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the preceding systems, and the like.

The electronic devices such as the computer systems/servers may be described in the general context of computer system executable instructions (for example, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are executed by remote processing devices that are linked through a communications network. In the distributed computing environments, the program modules may be located in local or remote computing system storage media including storage devices.

FIG. 1 is an exemplary flowchart of a depth recovery method for a monocular image according to embodiments of the present disclosure. As shown in FIG. 1, the depth recovery method for a monocular image includes the following steps.

At step 101, feature extraction is performed on a monocular image to obtain a feature image of the monocular image.

The monocular image here is also called a two-dimensional image. Information of the monocular image merely includes color information of pixels such as RGB information instead of depth information of the pixels. The embodiments of the present disclosure aim at estimating a corresponding depth image from the monocular image. Assuming that (x, y) is the coordinate of any pixel in the monocular image, the RGB information corresponding to the coordinate (x, y) may be determined from the monocular image, while the depth information corresponding to the coordinate (x, y) cannot be determined. In order to determine the depth information corresponding to the coordinate (x, y), the depth of the monocular image needs to be recovered.

In order to achieve depth recovery of the monocular image, first, feature extraction needs to be performed on the monocular image to obtain a feature image of the monocular image. The feature extraction here refers to performing depth sensing feature extraction on the monocular image to provide basic features for subsequently estimating the depth image.

In the embodiments of the present disclosure, a convolution operation is used for performing feature extraction on the monocular image.

At step 102, the feature image is decoupled to obtain a scene structure graph of the feature image.

The scene structure graph here includes scene structure information of the monocular image, wherein the scene structure information includes structure information of objects in the monocular image, and relative position relations among the objects (e.g., front and back relation), and essentially reflects relative depth information of the objects.

In the embodiments of the present disclosure, the feature image includes two types of information, i.e., scene structure information and depth scale information. It is extremely difficult to simultaneously estimate the two types of information. Therefore, according to the embodiments of the present disclosure, the feature image is decoupled to first estimate the scene structure information of the feature image and then to obtain a scene structure graph.

In the embodiments of the present disclosure, a convolution operation is used for estimating the scene structure information of the feature image.

At step 103, gradient sensing is performed on the feature image and the scene structure graph to obtain a region-enhanced feature image.

Considering that the geometry details of the depth image are significantly critical to disclosures such as 3D reconstruction, according to the embodiments of the present disclosure, an enhanced region of the feature image is estimated by means of gradient sensing so as to obtain a region-enhanced feature image.

In the embodiments of the present disclosure, the strong correlation between the gradient and the geometry details are used for estimating the gradient information of the obtained feature image and scene structure graph, separately, and the two estimation results are compared to determine the enhanced region so as to obtain the region-enhanced feature image. The geometry details enhanced in the region-enhanced feature image provide basic guarantee for subsequently obtaining a high-quality depth image.

At step 104, depth estimation is performed according to the region-enhanced feature image to obtain a depth image of the monocular image.

In the embodiments of the present disclosure, depth estimation is performed on the region-enhanced feature image by means of a convolution operation to obtain a depth image of the monocular image. Specifically, convolution calculation is performed on the region-enhanced feature image to obtain the depth image of the monocular image.

In the technical solutions of the embodiments of the present disclosure, depth estimation is decoupled into two parts, i.e., 1) estimation of a scene structure, and 2) estimation of the depth. In this way, convergence of a neural network is significantly accelerated, and the accuracy for depth estimation is improved. In addition, a high-quality depth image may be obtained by further improving the local details of the depth image by means of gradient sensing, thereby providing premium data sources for disclosures such as 3D reconstruction which require precise geometry details and accurate object borders.

Figure 2:
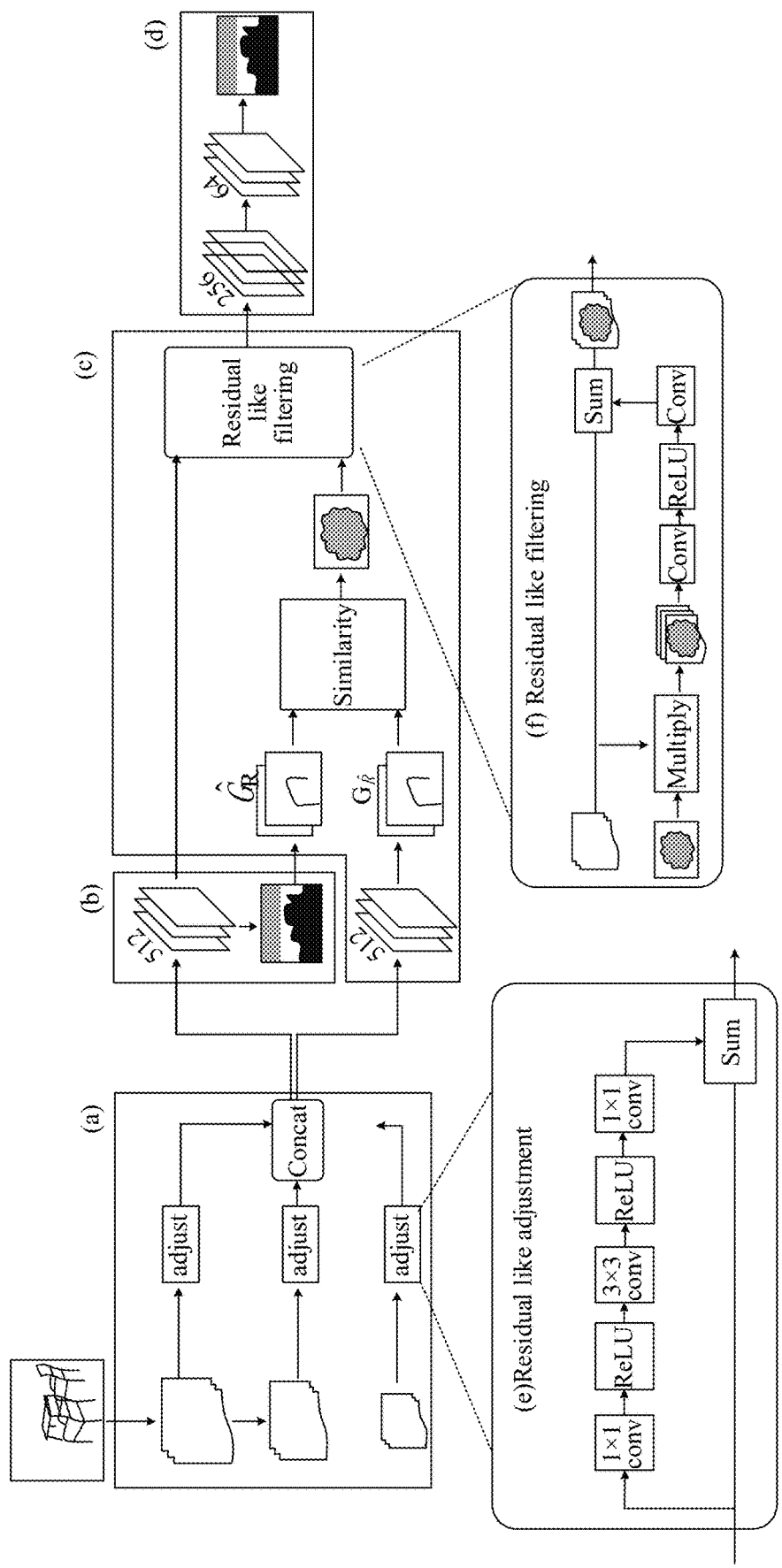
FIG. 2 is an architecture of a neural network according to embodiments of the present disclosure.

In order to implement the depth recovery method for a monocular image, the embodiments of the present disclosure further provide a neural network architecture (called DCNet). As shown in FIG. 2, the DCNet consists of three parts, i.e., 1) a feature extraction module, 2) a decoupling module, and 3) a gradient sensing module, wherein the decoupling module includes two parts, i.e., 2.1) a scene structure estimation module and 2.2) a depth estimation module. Referring to FIG. 2, the network in part (a) corresponds to the feature extraction module, the network in part (b) corresponds to the scene structure estimation module, the network in part (d) corresponds to the depth estimation module, and the network in part (c) corresponds to the gradient sensing module. In the embodiments of the present disclosure, a Euclidean loss function is used for training the DCNet shown in FIG. 2. In the DCNet shown in FIG. 2, feature extraction is performed, by the network in part (a), on the monocular image to obtain a feature image of the monocular image. The feature image is decoupled by the network in part (b) to obtain a scene structure graph of the feature image. Gradient sensing is performed, by the network in part (c), on the feature image and the scene structure graph to obtain a region-enhanced feature image. Depth estimation is performed by the network in part (d) according to the region-enhanced feature image to obtain a depth image of the monocular image.

Figure 3:
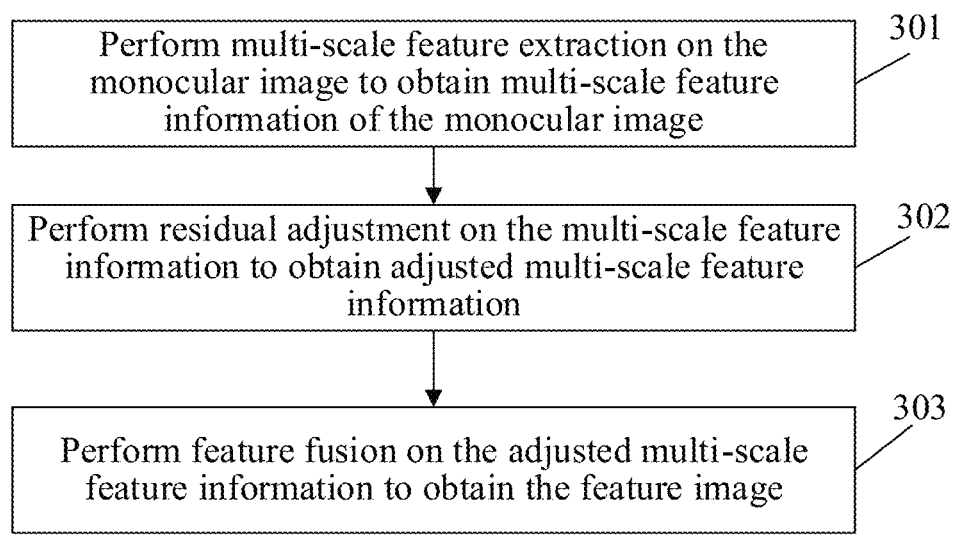
FIG. 3 is an exemplary flowchart of feature extraction of a monocular image according to embodiments of the present disclosure.

In the solution shown in FIG. 1, feature extraction of the monocular image may be performed by inputting the monocular image into a first neural network so as to obtain a feature image of the monocular image. Referring to FIG. 2 and FIG. 3, the following describes how to perform feature extraction by the first neural network.

FIG. 3 is an exemplary flowchart of feature extraction of a monocular image according to embodiments of the present disclosure. As shown in FIG. 3, the flow includes the following steps.

At step 301, multi-scale feature extraction is performed on the monocular image to obtain multi-scale feature information of the monocular image.

According to the DCNet shown in FIG. 2, the first neural network is the network in part (a). Referring to the network in part (a) in FIG. 2, the convolution layers in the left column are used for performing multi-scale feature extraction on the monocular image to obtain the multi-scale feature information of the monocular image.

At step 302, residual adjustment is performed on the multi-scale feature information to obtain adjusted multi-scale feature information.

The multi-scale feature information here indicates that the scales of the extracted feature information are different. The scale of some feature information is large, while the scale of some feature information is small. The feature information having small scale disappears after being fused due to the inconsistency of scales of the multi-scale feature information. Therefore, the residual like adjustment modules (referred to as adjust) (referring to (e) in FIG. 2) in the middle column is required for performing residual adjustment on the multi-scale feature information to obtain adjusted multi-scale feature information. The objective of residual adjustment here is to adjust different feature information in the multi-scale feature information to obtain a better fusion effect.

At step 303, feature fusion is performed on the adjusted multi-scale feature information to obtain the feature image.

In one embodiment, some feature information is selected from the adjusted multi-scale feature information, upsampled to a half of the input image in size, and inputted into the fusion module (Concat) on the right for feature fusion to obtain the feature image.

After being obtained through the step above, the feature image is inputted into a second neural network for decoupling to obtain the scene structure graph of the feature image. Referring to FIG. 2, the following describes how to estimate the scene structure graph by the second neural network.

According to the DCNet shown in FIG. 2, the second neural network is the network in part (b). After extracting a feature image I from the monocular image, the network in part (a) inputs the feature image I into the network in part (b) for predicting a scene structure graph R. In the embodiments of the present disclosure, the second neural network is pre-constructed, wherein the second neural network includes at least one convolution layer and a linear rectification function. The convolution layer here may be a channel 512, and the linear rectification function is implemented by a Rectified Linear Unit (ReLU). The relation between I and R is represented by the following formula:

$$I^{F1}R \qquad (1)$$

F1 indicates mapping from the feature image I to the scene structure graph R, and corresponds to the network in part (b) in FIG. 2. The network in part (b) is used for learning the scene structure graph R.

Figure 4:
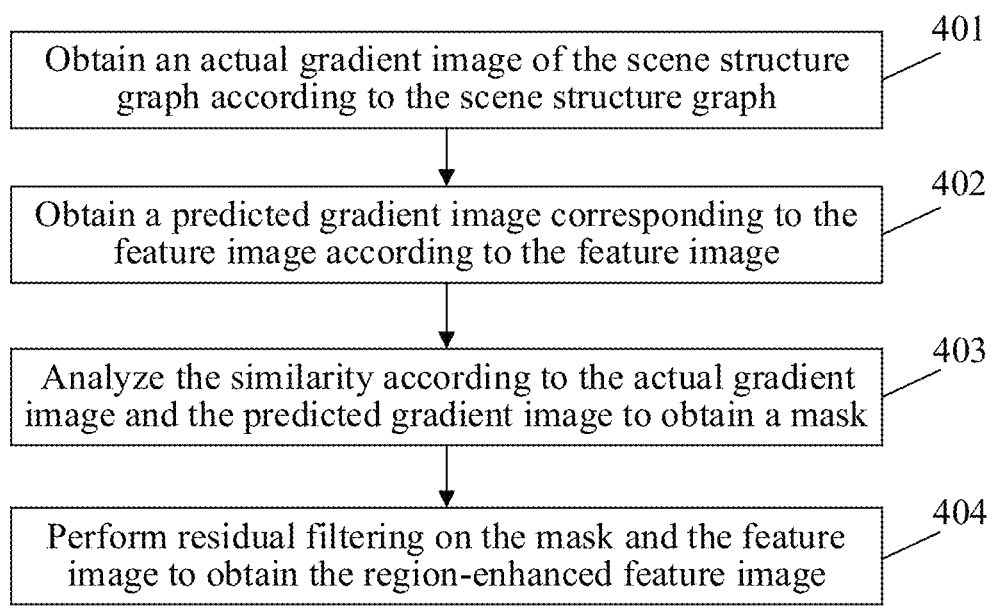
FIG. 4 is an exemplary flowchart of gradient sensing according to embodiments of the present disclosure.

In order to refine the layout details of an image, according to the embodiments of the present disclosure, gradient sensing is performed on the feature image and the scene structure graph to obtain a region-enhanced feature image. Gradient sensing here may involve inputting the feature image and the scene structure graph into a third neural network for gradient sensing to obtain the region-enhanced feature image. Referring to FIG. 2 and FIG. 4, the following describes how to perform gradient sensing by the third neural network.

FIG. 4 is an exemplary flowchart of gradient sensing according to embodiments of the present disclosure. As shown in FIG. 4, the flow includes the following steps.

At step 401, an actual gradient image of the scene structure graph is obtained according to the scene structure graph.

At step 402, a predicted gradient image corresponding to the feature image is obtained according to the feature image.

According to the DCNet shown in FIG. 2, the third neural network is the network in part (c). Referring to the network in part (c) in FIG. 2, the actual gradient image $G_R$ is estimated according to the scene structure graph R, and the predicted gradient image $\hat{G}_R$ is estimated according to the feature image I. Ideally, $G_{\tilde{R}}$ and $\hat{G}_R$ are the same. However, since $G_{\tilde{R}}$ is an actual gradient image, and $\hat{G}_R$ is a predicted gradient image, $G_R$ and $\hat{G}_R$ may be different.

At step 403, the similarity is analyzed according to the actual gradient image and the predicted gradient image to obtain a mask.

In some embodiments, the similarity between the actual gradient image and the predicted gradient image is calculated (for example, the similarity is calculated by means of a cosine function), and an actual gradient image having similarity greater than a preset threshold is used as the mask. Referring to the network in part (c) in FIG. 2, the similarity between $G_R$ and $\hat{G}_R$ is calculated, and an actual gradient image having similarity greater than is used as the mask.

The mask here corresponds to one region of the actual gradient image. The feature of the region facilitates further optimizing details of the depth image subsequently so that the depth image can be applied to high precision disclosures such as three-dimensional modeling.

At step 404, residual filtering is performed on the mask and the feature image to obtain the region-enhanced feature image.

In one embodiment, the region-enhanced feature image is obtained by the following modes: calculating the product of the mask and the feature image to obtain a fusion image; pre-processing the fusion image to obtain a pre-processed image, wherein the pre-processing sequentially includes: convolution calculation, linear rectification calculation, and convolution calculation; and superimposing the feature image and the pre-processed image to obtain the region-enhanced feature image. For example, referring to the network in part (f) (residual like filtering) in FIG. 2, the Multiply module is configured to calculate the product of the mask and the feature image to obtain a fusion image and sequentially input the fusion image into the Cony module, the RuLU module, and the Cony module so as to implement the corresponding convolution calculation, linear rectification calculation, and convolution calculation. The final result is superimposed onto the original feature image by the Sum module to output the region-enhanced feature image.

After the region-enhanced feature image is obtained through the solution above, convolution calculation is performed by the network in part (d) in FIG. 2 on the region-enhanced feature image to obtain the depth image of the monocular image. The convolution layer implementing convolution calculation here may be a channel 64.

In some embodiments of the present disclosure, estimation of the depth image is divided into estimation of the scene structure and estimation of the depth by the scene structure estimation module (the network in part (b) in FIG. 2) and the depth estimation module (the network in part (d) in FIG. 2), respectively according to a divide-and-conquer policy, thereby increasing the convergence speed of the DCNet and obtaining a more precise result. Moreover, a gradient sensing module is created between the scene structure estimation module and the depth estimation module. A region-enhanced feature image is obtained by the depth estimation module so that a neural network in a deep layer (such as the network in part (d) in FIG. 2) concentrates on an enhanced region, and a depth image having better border and details is recovered. The recovered high precision depth image provides high-quality data sources for disclosures such as three-dimensional reconstruction.

Figure 5:
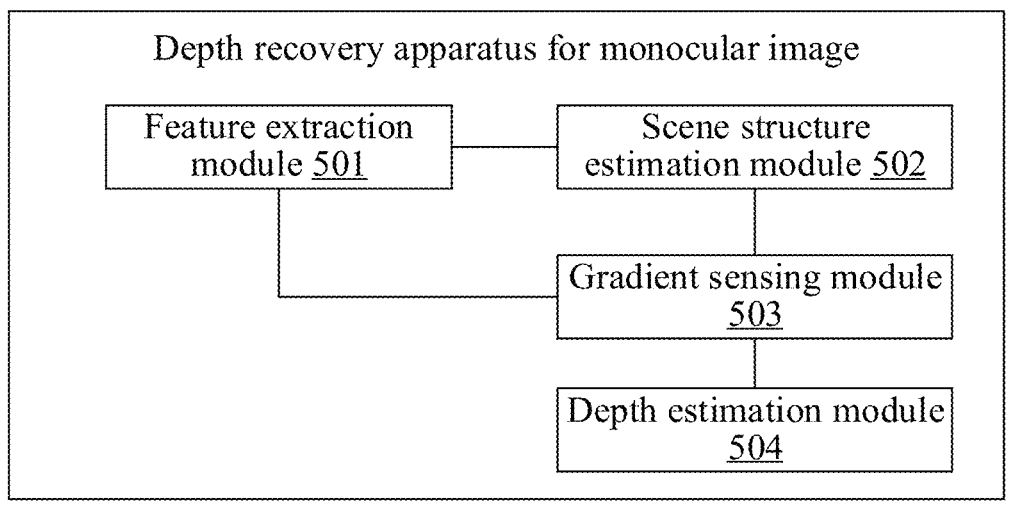
FIG. 5 is a schematic structural composition diagram I of a depth recovery apparatus for a monocular image according to embodiments of the present disclosure.

FIG. 5 is a schematic structural composition diagram I of a depth recovery apparatus for a monocular image according to embodiments of the present disclosure. As shown in FIG. 5, the depth recovery apparatus for a monocular image includes:

a feature extraction module 501, configured to perform feature extraction on a monocular image to obtain a feature image of the monocular image;

a scene structure estimation module 502, configured to decouple the feature image to obtain a scene structure graph of the feature image;

a gradient sensing module 503, configured to perform gradient sensing on the feature image and the scene structure graph to obtain a region-enhanced feature image; and a depth estimation module 504, configured to perform depth estimation according to the region-enhanced feature image to obtain a depth image of the monocular image.

It should be understood by persons skilled in the art that functions implemented by units in the depth recovery apparatus for a monocular image shown in FIG. 5 may be understood by referring to related descriptions of the preceding depth recovery methods for a monocular image. Functions implemented by units in the depth recovery apparatus for a monocular image shown in FIG. 5 may be implemented by a program operated on a processor or a specific logic circuit.

Figure 6:
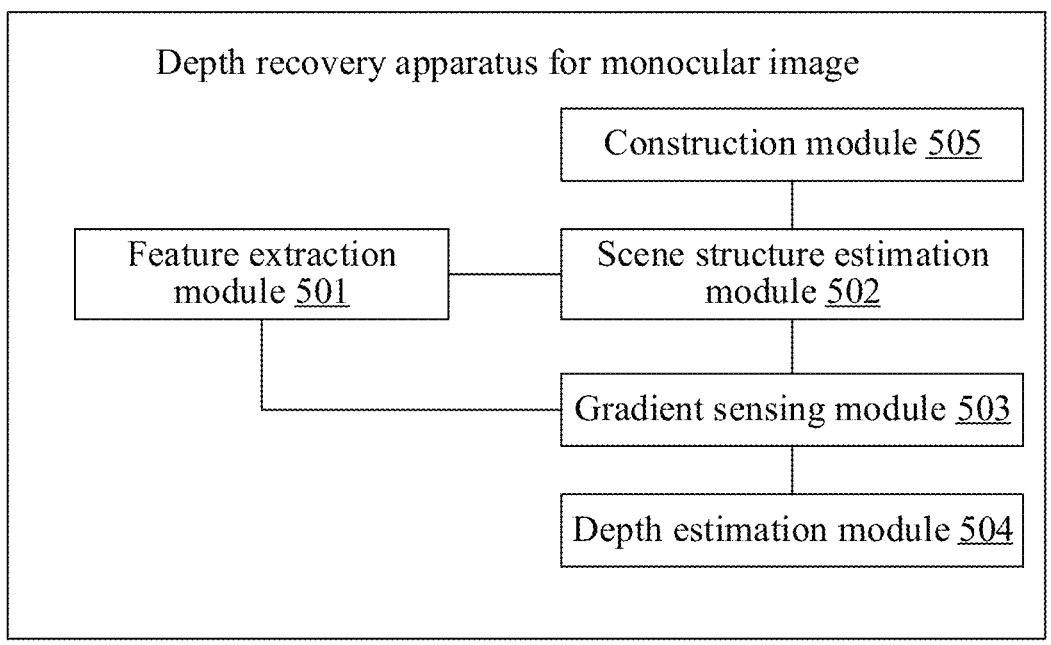
FIG. 6 is a schematic structural composition diagram II of a depth recovery apparatus for a monocular image according to embodiments of the present disclosure.

FIG. 6 is a schematic structural composition diagram II of a depth recovery apparatus for a monocular image according to embodiments of the present disclosure. As shown in FIG. 6, the depth recovery apparatus for a monocular image includes:

a feature extraction module 501, configured to perform feature extraction on a monocular image to obtain a feature image of the monocular image;

a scene structure estimation module 502, configured to decouple the feature image to obtain a scene structure graph of the feature image;

a gradient sensing module 503, configured to perform gradient sensing on the feature image and the scene structure graph to obtain a region-enhanced feature image; and a depth estimation module 504, configured to perform depth estimation according to the region-enhanced feature image to obtain a depth image of the monocular image.

In one embodiment, the feature extraction module 501 is configured to input the monocular image into a first neural network for feature extraction to obtain the feature image of the monocular image.

In one embodiment, the feature extraction performed by the first neural network includes: performing multi-scale feature extraction on the monocular image to obtain multi-scale feature information of the monocular image;

performing residual adjustment on the multi-scale feature information to obtain adjusted multi-scale feature information; and performing feature fusion on the adjusted multi-scale feature information to obtain the feature image.

In one embodiment, the scene structure estimation module 502 is configured to input the feature image into a second neural network for decoupling to obtain the scene structure graph of the feature image.

In one embodiment, the apparatus further includes:

a construction module 505, configured to pre-construct the second neural network, wherein the second neural network includes at least one convolution layer and a linear rectification function.

In one embodiment, the gradient sensing module 503 is configured to input the feature image and the scene structure graph into a third neural network for gradient sensing to obtain the region-enhanced feature image.

In one embodiment, the gradient sensing performed by the third neural network includes:

obtaining an actual gradient image of the scene structure graph according to the scene structure graph;

obtaining a predicted gradient image corresponding to the feature image according to the feature image;

analyzing the similarity according to the actual gradient image and the predicted gradient image to obtain a mask; and performing residual filtering on the mask and the feature image to obtain the region-enhanced feature image.

In one embodiment, the analyzing the similarity according to the actual gradient image and the predicted gradient image to obtain a mask includes:

calculating the similarity between the actual gradient image and the predicted gradient image; and using an actual gradient image having similarity greater than a preset threshold as the mask.

In one embodiment, the performing residual filtering on the mask and the feature image includes:

calculating the product of the mask and the feature image to obtain a fusion image;

pre-processing the fusion image to obtain a pre-processed image, wherein the pre-processing sequentially includes: convolution calculation, linear rectification calculation, and convolution calculation; and superimposing the feature image and the pre-processed image to obtain the region-enhanced feature image.

In one embodiment, the depth estimation module 504 is configured to perform convolution calculation on the region-enhanced feature image to obtain the depth image of the monocular image.

It should be understood by persons skilled in the art that functions implemented by units in the depth recovery apparatus for a monocular image shown in FIG. 6 may be understood by referring to related descriptions of the preceding depth recovery methods for a monocular image. Functions implemented by units in the depth recovery apparatus for a monocular image shown in FIG. 6 may be implemented by a program operated on the processor or a specific logic circuit.

According to the embodiments of the present disclosure, the depth recovery apparatus for a monocular image may also be stored in one computer-readable storage medium when being implemented in the form of a software functional module and sold or used as an independent product. Based on such an understanding, the technical solutions in the embodiments of the present disclosure or a part thereof contributing to the prior art may be essentially embodied in the form of software product. The computer software product is stored in one storage medium and includes several instructions so that one computer device (which may be a personal computer, a server, a network device, and the like) implements all or a part of the method in the embodiments of the present disclosure. Moreover, the preceding storage medium includes media having program codes stored such as a USB flash drive, a mobile hard disk drive, a Read-only Memory (ROM), a floppy disk, and an optical disc. In this way, the embodiments of the present disclosure are not limited to any combination of particular hardware and software.

Accordingly, the embodiments of the present disclosure further provide a computer storage medium having computer executable instructions stored. When the computer executable instructions are executed by a processor, the depth recovery method for a monocular image according to the embodiments of the present disclosure is implemented.

Figure 7:
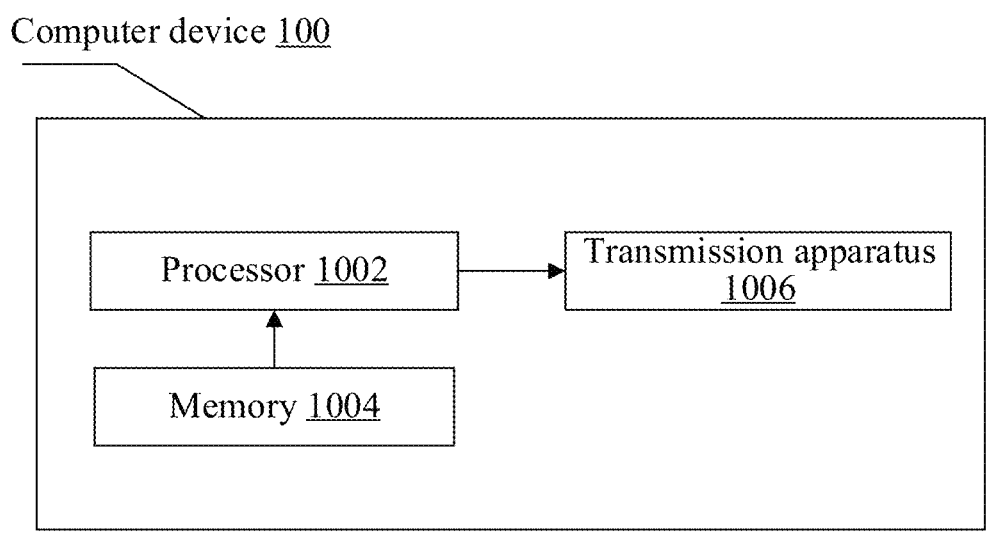
FIG. 7 is a schematic structural composition diagram of a computer device according to embodiments of the present disclosure.

FIG. 7 is a schematic structural composition diagram of a computer device according to embodiments of the present disclosure. As shown in FIG. 7, a computer device 100 includes one or more (only one shown in the drawing) processors 1002 (the processor 1002 includes but not limited to processing apparatuses such as a Micro Controller Unit (MCU) and a Field Programmable Gate Array (FPGA), a memory 1004 configured to store data, and a transmission apparatus 1006 configured to communicate. Persons skilled in the art can understand that the structure shown in FIG. 7 is merely exemplary, and does not constitute a definition on the structure of the electronic apparatus above. For example, the computer device 100 may further include more or less components than those shown in FIG. 7, or has configurations different from those shown in FIG. 7.

The memory 1004 is configured to store a software program of disclosure software and modules such as the program instructions/modules corresponding to the methods according to the embodiments of the present disclosure. The processor 1002 operates the software program stored in the memory 1004 and the modules so as to implement function disclosures and data processing, i.e., implementing the methods. The memory 1004 may include high-speed random memories and may also include non-volatile memories such as one or more magnetic storage apparatuses, flashes, or other non-volatile solid memories. In some embodiments, the memory 1004 may further include memories remotely provided relative to the processor 1002. These remote memories may be connected to the computer device 100 via a network. Instances of the network above include but not limited to Internet, Intranet, local area network, a mobile communication network, and a combination thereof.

The transmission apparatus 1006 is configured to receive or send data via one network. The specific instances of the network above may include wireless networks provided by a communication provider of the computer device 100. In one embodiment, the transmission apparatus 1006 includes one Network Interface Controller (NIC) connected to other network devices via a base station to communicate with Internet. In one embodiment, the transmission apparatus 1006 may be a Radio Frequency (RF) module configured to communicate with Internet in a wireless manner.

The technical solutions recited in the embodiments of the present disclosure can be arbitrarily combined without causing conflicts.

It should be understood that the disclosed methods and smart devices in the embodiments provided in the present disclosure may be implemented by other modes. The device embodiments described above are merely exemplary. For example, the unit division is merely logical function division and may be actually implemented by other division modes. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be implemented in electronic, mechanical, or other forms.

The units described as separate components may or may not be physically separate, and the components displayed as units may or may not be physical units, may be located at one position, or may be distributed on a plurality of network units. A part of or all of the units may be selected according to actual needs to achieve the objectives of the solutions of the embodiments.

In addition, the functional units in the embodiments of the present disclosure may be integrated into one second processing unit, or each of the units may exist as an independent unit, or two or more units are integrated into one unit, and the integrated unit may be implemented in the form of hardware, or may also be implemented in the form of a hardware and software functional unit.

The descriptions above are only specific implementations of the present disclosure. However, the scope of protection of the present disclosure is not limited thereto. Within the technical scope disclosed by the present disclosure, any variation or substitution that can be easily conceived of by those skilled in the art should all fall within the scope of protection of the present disclosure.

INDUSTRIAL APPLICABILITY

In the technical solutions according to the embodiments of the present disclosure, feature extraction is performed on a monocular image to obtain a feature image of the monocular image; the feature image is decoupled to obtain a scene structure graph of the feature image; gradient sensing is performed on the feature image and the scene structure graph to obtain a region-enhanced feature image; and depth estimation is performed according to the region-enhanced feature image to obtain a depth image of the monocular image. According to the depth recovery methods and apparatuses for a monocular image, a small amount of data is used for obtaining a better depth estimation result, and more depth details are also obtained by performing gradient sensing.

The invention claimed is:

1. A depth recovery method for a monocular image, the method comprising:
    performing feature extraction on the monocular image to obtain a feature image of the monocular image;
    decoupling the feature image to obtain a scene structure graph of the feature image;
    performing gradient sensing on the feature image and the scene structure graph to obtain a region-enhanced feature image; and
    performing depth estimation according to the region-enhanced feature image to obtain a depth image of the monocular image.

2. The method according to claim 1, wherein the performing feature extraction on a monocular image to obtain a feature image of the monocular image comprises:
    inputting the monocular image into a first neural network for feature extraction to obtain the feature image of the monocular image.

3. The method according to claim 2, wherein the feature extraction performed by the first neural network comprises:
    performing multi-scale feature extraction on the monocular image to obtain multi-scale feature information of the monocular image;
    performing residual adjustment on the multi-scale feature information to obtain adjusted multi-scale feature information; and
    performing feature fusion on the adjusted multi-scale feature information to obtain the feature image.

4. The method according to claim 1, wherein the decoupling the feature image to obtain a scene structure graph of the feature image comprises:
    inputting the feature image into a second neural network for decoupling to obtain the scene structure graph of the feature image.

5. The method according to claim 4, before the inputting the feature image into a second neural network, further comprising:
    pre-constructing the second neural network, wherein the second neural network comprises at least one convolution layer and a linear rectification function.

6. The method according to claim 1, wherein the performing gradient sensing on the feature image and the scene structure graph to obtain a region-enhanced feature image comprises:
    inputting the feature image and the scene structure graph into a third neural network for gradient sensing to obtain the region-enhanced feature image.

7. The method according to claim 6, wherein the gradient sensing performed by the third neural network comprises:
    obtaining an actual gradient image of the scene structure graph according to the scene structure graph;
    obtaining a predicted gradient image corresponding to the feature image according to the feature image;
    analyzing the similarity according to the actual gradient image and the predicted gradient image to obtain a mask; and
    performing residual filtering on the mask and the feature image to obtain the region-enhanced feature image.

8. The method according to claim 7, wherein the analyzing the similarity according to the actual gradient image and the predicted gradient image to obtain a mask comprises:
    calculating the similarity between the actual gradient image and the predicted gradient image; and
    using an actual gradient image having similarity greater than a preset threshold as the mask.

9. The method according to claim 7, wherein the performing residual filtering on the mask and the feature image comprises:
    calculating a product of the mask and the feature image to obtain a fusion image;
    pre-processing the fusion image to obtain a pre-processed image, wherein the pre-processing sequentially comprises: convolution calculation, linear rectification calculation, and convolution calculation; and
    superimposing the feature image and the pre-processed image to obtain the region-enhanced feature image.

10. The method according to claim 1, wherein the performing depth estimation according to the region-enhanced feature image to obtain a depth image of the monocular image comprises:
    performing convolution calculation on the region-enhanced feature image to obtain the depth image of the monocular image.

11. A depth recovery apparatus for a monocular image, comprising:
    a memory storing processor-executable instructions; and
    a processor arranged to execute the stored processor-executable instructions to perform steps of:
    performing feature extraction on the monocular image to obtain a feature image of the monocular image;
    decoupling the feature image to obtain a scene structure graph of the feature image;
    performing gradient sensing on the feature image and the scene structure graph to obtain a region-enhanced feature image; and
    performing depth estimation according to the region-enhanced feature image to obtain a depth image of the monocular image.

12. The apparatus according to claim 11, wherein the performing feature extraction on a monocular image to obtain a feature image of the monocular image comprises:

inputting the monocular image into a first neural network for feature extraction to obtain the feature image of the monocular image.

13. The apparatus according to claim 12, wherein the feature extraction performed by the first neural network comprises:
performing multi-scale feature extraction on the monocular image to obtain multi-scale feature information of the monocular image;
performing residual adjustment on the multi-scale feature information to obtain adjusted multi-scale feature information; and
performing feature fusion on the adjusted multi-scale feature information to obtain the feature image.

14. The apparatus according to claim 11, wherein the decoupling the feature image to obtain a scene structure graph of the feature image comprises:
inputting the feature image into a second neural network for decoupling to obtain the scene structure graph of the feature image.

15. The apparatus according to claim 14, wherein the processor is arranged to execute the stored processor-executable instructions to further perform steps of: before the inputting the feature image into a second neural network, pre-constructing the second neural network, wherein the second neural network comprises at least one convolution layer and a linear rectification function.

16. The apparatus according to claim 11, wherein the performing gradient sensing on the feature image and the scene structure graph to obtain a region-enhanced feature image comprises:
inputting the feature image and the scene structure graph into a third neural network for gradient sensing to obtain the region-enhanced feature image.

17. The apparatus according to claim 16, wherein the gradient sensing performed by the third neural network comprises:
obtaining an actual gradient image of the scene structure graph according to the scene structure graph;
obtaining a predicted gradient image corresponding to the feature image according to the feature image;
analyzing the similarity according to the actual gradient image and the predicted gradient image to obtain a mask; and
performing residual filtering on the mask and the feature image to obtain the region-enhanced feature image.

18. The apparatus according to claim 17, wherein the analyzing the similarity according to the actual gradient image and the predicted gradient image to obtain a mask comprises:
calculating the similarity between the actual gradient image and the predicted gradient image; and
using an actual gradient image having similarity greater than a preset threshold as the mask.

19. The apparatus according to claim 17, wherein the performing residual filtering on the mask and the feature image comprises:
calculating a product of the mask and the feature image to obtain a fusion image;
pre-processing the fusion image to obtain a pre-processed image, wherein the pre-processing sequentially comprises: convolution calculation, linear rectification calculation, and convolution calculation; and
superimposing the feature image and the pre-processed image to obtain the region-enhanced feature image.

20. A non-transitory computer-readable storage medium having stored thereon computer-readable instructions that, when executed by a processor, cause the processor to implement a depth recovery method for a monocular image, the method comprising:
performing feature extraction on the monocular image to obtain a feature image of the monocular image;
decoupling the feature image to obtain a scene structure graph of the feature image;
performing gradient sensing on the feature image and the scene structure graph to obtain a region-enhanced feature image; and
performing depth estimation according to the region-enhanced feature image to obtain a depth image of the monocular image.

* * * * *